United States Patent

Beljanski et al.

[11] Patent Number: 5,985,991
[45] Date of Patent: *Nov. 16, 1999

[54] OIL RESISTANT SILICONE SEALANTS CONTAINING A METAL ACETATE

[75] Inventors: Philip David Beljanski, Midland; Peter James Houck, Saginaw; Loren Dale Lower, Midland, all of Mich.

[73] Assignee: Dow Corning Corporation, Midland, Mich.

[*] Notice: This patent is subject to a terminal disclaimer.

[21] Appl. No.: 08/872,618

[22] Filed: Jun. 10, 1997

[51] Int. Cl.⁶ ............................................ C08K 3/08
[52] U.S. Cl. .................. 524/779; 524/781; 524/789; 524/860; 528/14; 528/15; 528/16; 528/17; 528/19
[58] Field of Search .................. 528/15, 21, 16, 528/17, 19, 14, 18; 524/779, 781, 789, 860

[56] References Cited

U.S. PATENT DOCUMENTS

| | | | |
|---|---|---|---|
| 2,449,572 | 9/1948 | Welsh | 528/33 |
| 3,542,901 | 11/1970 | Cooper et al. | 260/825 |
| 4,123,472 | 10/1978 | Getson et al. | 260/827 |
| 4,257,932 | 3/1981 | Beers | 260/18 S |
| 4,680,363 | 7/1987 | Beers | 528/14 |
| 4,689,363 | 8/1987 | Inoue et al. | 524/394 |
| 4,758,611 | 7/1988 | Beers | 523/212 |
| 4,797,462 | 1/1989 | Letoffe et al. | 528/12 |
| 4,833,037 | 5/1989 | Beers | 428/448 |
| 5,300,611 | 4/1994 | Fujioka et al. | 528/15 |
| 5,489,479 | 2/1996 | Lucas et al. | 428/412 |
| 5,708,113 | 1/1998 | Beuschel et al. | 528/15 |

OTHER PUBLICATIONS

Chemical Abstracts, Vol. 115, No. 12, Sep. 23, 1991, Columbus OH, US.

Dow Corning Docket No. DC4539 Oil Resistant Silicone Sealants, Philip D. Beljanski and Loren D. Lower filed concurrently with DC4538.

*Primary Examiner*—Melvyn I. Marquis
*Assistant Examiner*—Mark W. Milstead
*Attorney, Agent, or Firm*—Patricia M. Scaduto

[57] ABSTRACT

The invention relates to a RTV silicone composition having increased hot oil resistance upon curing. The RTV silicone composition comprises a polydiorganosiloxane, an acyloxy-functional crosslinker, a metal salt of a carboxylic acid catalyst, a filler, and a metal acetate. In a preferred embodiment a metal acetylacetonate is also added.

11 Claims, No Drawings

OIL RESISTANT SILICONE SEALANTS CONTAINING A METAL ACETATE

BACKGROUND OF THE INVENTION

1. Field of the Invention

This invention relates to room temperature vulcanizing (RTV) silicone compositions, curable in the presence of moisture, comprising polydiorganosiloxanes, acyloxy-functional crosslinkers and additives such as metal acetates and metal acetylacetonates which provide oil resistance to the cured composition.

2. Background Information

The use of room temperature vulcanizing (RTV) silicone sealants for creating formed-in-place gaskets is well known in both original equipment manufacture and in repair and maintenance. A problem with certain conventional silicone sealants is their tendency in the presence of hot oil to lose structural integrity leading to seal failure. Therefore, it is desirable to have silicone sealants providing increased oil resistance as demonstrated by increased tensile strength in the presence of hot oil.

Getson, et al., U.S. Pat. No. 4,123,472, describe oil resistant organopolysiloxane compositions prepared by polymerizing an acrylic ester and an acrylic nitrile in the presence of an organopolysiloxane and a free radical initiator at an elevated temperature. This modified polysiloxane when mixed with a crosslinking agent, such as an acyloxy-functional silane, and exposed to moisture and heat aging, cures to an oil resistant composition.

Beers, U.S. Pat. No. 4,680,363, describes a process for forming a one component RTV silicone rubber composition with good bonding properties at high humidity conditions, and Beers, U.S. Pat. No. 4,758,611, describes the RTV silicone composition comprising a silanol-endblocked diorganopolysiloxane, an acyloxy-functional crosslinking agent, a curing promoter which is a salt of a carboxylic acid, and a magnesium or zinc salt of a carboxylic acid as an acid scavenger.

Beers, U.S. Pat. No 4,833,037, describes a laminated article comprising a plurality of metal substrates, wherein between the metal substrates there is a layer of a one component RTV silicone rubber composition with good bonding properties at high humidity conditions, comprising a silanol-endblocked diorganopolysiloxane, an acyloxy-functional crosslinking agent, a curing promoter which is a salt of a carboxylic acid, and an acid scavenger selected from magnesium or zinc oxide, magnesium, aluminum or zinc metal, magnesium or zinc salt of a carboxylic acid, or mixtures thereof.

Beers, U.S. Pat. No. 4,257,932 describes a self-bonding silicone RTV comprising a silanol endstopped polydiorganosiloxane; a fluid polysiloxane having a high degree of tri or tetrafunctionality; a silica filler; a crosslinking silane evolving relatively low volatility carboxylic acid fragments on hydrolysis; and a tin catalyst. Beers, also discloses the improvement of high temperature performance with the addition of an iron oxide thermal stabilizer.

Letoffe, et al., U.S. Pat. No. 4,797,462, describe organopolysiloxanes curable into elastomeric state and well adapted as sealing materials for a variety of substrates, comprising a polyhydroxylated polysiloxane, a polyacyloxysilane crosslinking agent and an effective amount of at least one of calcium oxide, strontium oxide and/or barium oxide cure accelerator therefor.

The present inventors have unexpectedly determined that the addition of a metal acetate, preferably along with a metal acetylacetonate, to a RTV silicone composition comprising a polydiorganosiloxane, acyloxy-functional crosslinker, filler, and tin catalyst results in a cured composition having increased hot oil resistance. In addition, these compositions may find use when cured as sealants, adhesives, gaskets, coatings, molding and potting compounds, and gels.

The objective of this invention is to provide a RTV silicone composition having increased hot oil resistance upon curing.

SUMMARY OF THE INVENTION

The present invention is a RTV silicone composition having increased hot oil resistance when cured. The RTV silicone composition which is curable in the presence of moisture comprises a polydiorganosiloxane, an acyloxy-functional crosslinker, a metal salt of a carboxylic acid catalyst, a filler, a metal acetate, and optionally a metal acetylacetonate.

DETAILED DESCRIPTION OF THE INVENTION

This invention is a RTV silicone composition which is curable in the presence of moisture and has increased hot oil resistance upon curing comprising:

(A) 100 parts by weight of a polydiorganosiloxane in which the terminal groups are selected from the group consisting of silanol and triorganosilyl groups, provided at least 60 mole percent of the terminal groups are silanol groups;

(B) 1 to 15 parts by weight of an acyloxy-functional crosslinking agent described by the formula $$R_m Si(OCOR')_{4-m}$$

where R is a monovalent hydrocarbon radical comprising from 1 to about 12 carbon atoms, each R' is an independently selected monovalent hydrocarbon radical comprising from 1 to about 12 carbon atoms, and m is 0 or 1;

(C) 0.001 to 1 part by weight of a metal salt of a carboxylic acid catalyst;

(D) 5 to 150 parts by weight of a filler;

(E) an effective amount of a metal acetate; and (F) optionally, an effective amount of a metal acetylacetonate.

Component (A) is a polydiorganosiloxane having terminal groups selected from the group consisting of silanol and triorganosilyl groups, provided at least 60 mole percent of the terminal groups are silanol groups. The polydiorganosiloxane may be one type of polymer or a mixture of different polymers. The polydiorganosiloxanes may have a linear structure and may be homopolymers or copolymers. In addition, the organic groups linked to any particular silicon atom may be the same or different. The organic groups of the polydiorganosiloxane can include any monovalent hydrocarbon group or any monovalent halohydrocarbon group comprising 1 to about 18 carbon atoms. Preferred organic groups are methyl, ethyl, propyl, phenyl, vinyl, and 3,3,3-trifluoropropyl, with methyl being most preferred.

The terminal groups of the polydiorganosiloxane are selected from the group consisting of silanol and triorganosilyl groups. The organic substituent of the triorganosilyl groups can include any monovalent hydrocarbon group or any monovalent halohydrocarbon group comprising 1 to about 18 carbon atoms. The preferred organic substituent of the triorganosilyl groups are methyl, ethyl, propyl, phenyl, vinyl, and 3,3,3-trifluoropropyl, with methyl being most preferred.

Although the terminal groups are selected from silanol and triorganosilyl groups, it is required that at least 60 mole percent of the terminal groups be silanol groups in order to obtain the desired properties of the composition when cured. Preferably, 80 to 100 mole percent of the terminal groups of the polydiorganosiloxane are silanol groups.

The viscosity of the polydiorganosiloxane may be from about 1 to 150 Pa.s at 25° C. The preferred viscosity of the polydiorganosiloxane is from about 5 to 100 Pa.s at 25° C.

The methods of manufacture of the silanol terminated polydiorganosiloxanes are well known in the art. One common method is based upon the hydrolysis of diorganodichlorosilane, the separation of a diorganotetrasiloxane cyclic material from the hydrolysis mixture, and the subsequent polymerization of the cyclic material to the polydiorganosiloxane through the use of an alkaline catalyst. The triorganosilyl terminated polydiorganosiloxanes are also prepared by known methods, such as described in Dupree, U.S. Pat. No. 3,274,145, which is hereby incorporated by reference.

Component (B) is an acyloxy-functional crosslinking agent described by the formula $$R_m Si(OCOR')_{4-m}$$

where R is a monovalent hydrocarbon radical comprising from 1 to about 12 carbon atoms, each R' is an independently selected monovalent hydrocarbon radical comprising from 1 to about 12 carbon atoms, and m is 0 or 1.

R is a monovalent hydrocarbon radical comprising from 1 to about 12 carbon atoms. The monovalent hydrocarbon radicals represented by R may be linear or branched and can include alkyl radicals such as methyl, ethyl, isopropyl, or hexyl; alkenyl radicals such as vinyl, allyl or hexenyl; alkynal radicals such as propargyl; cycloaliphatic radicals such as cyclopentyl, cyclohexyl or cyclohexenyl; aromatic radicals such as phenyl or tolyl; and aralkyl radicals such as benzyl or beta-phenylethyl. R is preferably methyl or ethyl.

Each R' is an independently selected monovalent hydrocarbon radical comprising from 1 to about 12 carbon atoms. Examples of R' include those provided for R. R' is preferably methyl or ethyl, with methyl being most preferred.

The acyloxy-functional crosslinker may have trifunctionality, as occurs when m is 1 or tetrafunctionality, as occurs when m is 0. It is preferred that m be 1.

Examples of preferred acyloxy-functional crosslinkers include methyltriacetoxysilane, ethyltriacetoxysilane, methyl-tris-benzoxysilane, vinyltriacetoxysilane and methyl-tris-2-ethylhexanoxy silane.

The acyloxy-functional crosslinker can be present in the present composition in amounts from 1 to 15 parts by weight based on 100 parts by weight of the polydiorganosiloxane, and preferably from 2 to 10 parts by weight on the same basis. The acyloxy-functional crosslinker may be added as a single species or as a mixture of two or more species.

Component (C) is a metal salt of a carboxylic acid catalyst. The metal component of the catalyst is preferably tin, but may be for example, lead, chromium, antimony, iron, cadmium, barium, titanium, bismuth, or magnesium. Examples of suitable metal salts of carboxylic acids include tin naphthenate, lead octoate, tin octoate, iron stearate, tin oleate, dibutyltindilaurate, dibutyltindiacetate, dibutyl tin oxide, and dimethyl tin bis-neodecanoate. Preferred catalysts are dibutyltindilaurate, dibutyltindiacetate, and dimethyl tin bis-neodecanoate. The most preferred catalysts are dibutyltindilaurate and dibutyltindiacetate.

The catalyst can be present in the present composition in amounts from 0.001 to 1 part by weight based on 100 parts by weight of the polydiorganosiloxane, and preferably from 0.01 to 0.3 part by weight on the same basis. It is most preferred to have 0.01 to 0.2 part by weight catalyst present in the composition on the same basis. The catalyst may be added as a single species or as a mixture of two or more species.

In order to obtain the desired physical properties of the present composition when cured, a filler (component (D)) is added to the composition. This filler may include reinforcing fillers, semi-reinforcing fillers, or non-reinforcing fillers also called extending fillers, or any combination thereof. One or more of each type of filler is also acceptable.

Reinforcing fillers include any finely divided form of silica which can be prepared by precipitation or a pyrogenic process and may be treated or untreated. Generally, methods of treating the silica can include mixing the silica with polycyclosiloxane such as disclosed in Lucas U.S. Pat. No. 2,938,009, and Lichtenwalner U.S. Pat. No. 3,004,859, or silazanes as disclosed in Smith U.S. Pat. No. 3,635,743, which are incorporated herein by reference. The treating agents may also include liquid hydroxyl-terminated polydiorganosiloxanes which can contain an average of about 2 to 20 repeating units and can contain at least one alkenyl unit. The treating agent may also be an alkylhalosilane, such as dimethyldichlorosilane or an alkoxysilane. Carbon black is also useful as a reinforcing filler in this invention. Semi-reinforcing fillers include barium sulfate and crystalline silica. Non-reinforcing or extending fillers include glass spheres, wollastonite, diatomaceous earths, clay, and talc. The preferred fillers are untreated fumed silica and treated fumed silica.

The filler can be present in the present composition in amounts from 5 to 150 parts by weight based on 100 parts by weight of the polydiorganosiloxane, and preferably from 5 to 30 parts by weight on the same basis. The filler may be added as a single species or as a mixture of two or more species.

Component (E) comprises an effective amount of a metal acetate. The inventors have unexpectedly determined that the addition of a metal acetate to an RTV silicone composition provides the composition upon curing with increased hot oil resistance.

The metal portion of the metal acetate may be selected from the group consisting of calcium, zinc, magnesium, aluminum, zirconium, barium, titanium, strontium, and copper. Examples of the metal acetate include calcium acetate, zinc acetate, magnesium acetate, aluminum acetate, zirconium acetate, barium acetate, titanium IV acetate, strontium acetate and copper II acetate. The metal portion of the metal acetate is preferably calcium or strontium and most preferably calcium.

An effective amount of the metal acetate is an amount which provides increased hot oil resistance to the RTV silicone composition upon curing. Typically, about 0.01 to 10 parts by weight metal acetate based on 100 parts by weight of the polydiorganosiloxane is effective. It is preferable to add about 0.01 to 1.5 parts by weight metal acetate on the same basis, with amounts from about 0.01 to 1 part by weight on the same basis being most preferred. The metal acetate may be added as a single species or as a mixture of two or more species.

In a preferred embodiment, an effective amount of Component (F) a metal acetylacetonate, is also added to the RTV silicone composition. The metal portion of the metal acetylacetonate is preferably copper, iron or zirconium, with copper being most preferable, but may be selected from the group consisting of copper, chromium, iron, aluminum, zinc, titanium, and zirconium. Examples of the metal acetylacetonate include copper II acetylacetonate, ferric acetylacetonate, chromium III acetylacetonate, and zinc acetylacetonate. The addition of a metal acetylacetonate to the present RTV silicone composition without a metal acetate also provides the composition upon curing with increased hot oil resistance.

Although the addition of the metal acetylacetonate is optional, in a preferred embodiment, an effective amount of the metal acetylacetonate is added to the present composition. An effective amount is an amount which provides increased hot oil resistance to the RTV silicone composition upon curing. Typically, an effective amount of the metal acetylacetonate is from about 0.01 to 5 parts by weight based on 100 parts by weight of the polydiorganosiloxane. Preferably, the metal acetylacetonate is present in amounts from about 0.05 to 1.5 parts by weight on the same basis, with amounts from about 0.1 to 0.6 part by weight metal acetylacetonate on the same basis being most preferred. The metal acetylacetonate may be added as a single species or as a mixture of two or more species.

In preferred embodiments, the present composition can also optionally include up to about 2 parts by weight of an adhesion promoter based on 100 parts by weight of the polydiorganosiloxane. Examples of useful adhesion promoters include ethylpolysilicate and glycidoxypropyltrimethoxysilane.

In addition to the above ingredients, the present composition may include additives which impart or enhance certain properties of the cured composition or facilitate processing of the curable composition. Typical additives include, but are not limited to: plasticizers, functional and non-functional diluents, pigments, dyes, heat and/or ultraviolet light stabilizers, flame-retardant agents, thickeners, rheology modifiers, and preservatives. The effect of any such additives should be evaluated as to their result and impact on other properties of the composition.

The RTV silicone composition of this invention may be prepared by mixing all the ingredients together in amounts as specified to provide a composition which is stable in the absence of moisture and which cures to an elastomeric material when exposed to moisture.

These compositions are preferably prepared by mixing all the ingredients under anhydrous conditions. This means that the amounts of moisture or water in the ingredients used should be minimized and the conditions of mixing should minimize the amounts of moisture or water allowed into the system. Excess moisture or water may have deleterious effects on the composition, such as causing curing in the storage package or reduced cured properties.

The present compositions may be prepared as either a one package system or a two (or multi) package system. With a one package system, all the ingredients are mixed together and stored in an anhydrous state. With a two or multi package system the ingredients may be stored separately and then mixed prior to use. For example, it is often convenient to form a "base" blend comprising a polydiorganosiloxane, a filler and, if needed, a plasticizer (I). Another blend comprising curing agents such as the crosslinker and catalyst may also be mixed together (II) and still another blend comprising additional ingredients including Components (E) and (F) may also be mixed together (III). As described above, the components comprising (I), (II) and (III) may be mixed together or separately. If mixed and stored together a one part sealant results. Obviously a two or multi package system is possible if (I), (II), and (III) are mixed and packaged separately. It is also possible to mix and store two of the components together, ie., (I) and (III) and later mix in (II). In a preferred embodiment of the present invention it is preferred to mix and store (I) and (II) together and then later mix in (III) as required.

The present RTV silicone compositions may be used, for example, as gasket materials for sealing gaps or seams in a given substrate or for sealing between substrates. Due to the oil resistance of the present RTV silicone compositions when cured these compositions are preferably used for sealing gaps or substrates having surfaces exposed to oil or hot oil. However, these RTV silicone compositions may also be used to seal gaps or substrates which may not have surfaces exposed to oil or hot oil.

A method for sealing using the present composition comprises for example, (i) providing at least two substrates having a plurality of surfaces; (ii) applying a layer of a RTV silicone composition which is curable in the presence of moisture, to at least a portion of at least one of the surfaces of at least one of the substrates, the RTV silicone composition comprising Components (A)–(E) and preferably also Component (F), as described above; (iii) bringing at least two of the substrates, where at least one of the substrates has the RTV silicone composition applied thereto, into proximity so as to form a gasket of the RTV silicone composition therebetween; and (iv) exposing the gasket of step (iii) to moisture to effect curing of the RTV silicone composition.

The substrates useful for this preferred embodiment can be metal materials, composites or certain plastic materials. Preferably the substrates are metal materials.

EXAMPLES

The following examples are presented for illustrative purposes and should not be construed as limiting the invention which is delineated in the claims.

In the following examples, unless otherwise noted, the compositions were mixed at 23° C.±2° C. and 50%±5% relative humidity; cast, and then cured for 7 days at 23° C.±2° C. and 50%±5% relative humidity before oil immersion testing. The cured samples were then immersed in oil for 14 days at 150° C. per ASTM D471 except the samples were cooled to 23° C.±2° C. in the test fluid rather than in a cooling fluid. The oil used for immersion testing was Goodwrench 5W30 SAE SH/SG. The durometer (Shore A) results provided in each table were obtained using the method described in ASTM D2240 with the following exceptions: 2.54 cm×1.91 cm tabs having a thickness of 0.64 cm were tested and an average of 5 readings were reported. The tensile, 100% modulus, and elongation results provided in each table were obtained using the method described in ASTM D412 with each tensile, 100% modulus, and elongation value reported as the average of 3 samples. Volume swell % results were obtained using the method described in ASTM 471. Also, as used herein "part" or "parts" are by weight and "AcAc" refers to acetylacetonate.

Prior to use, the metal acetate powder was dried at 105° C. for a minimum of 2 hrs. Calcium acetate was obtained from Aldrich Chemical (Milwaukee, Wis.). Strontium acetate was obtained from Acros Organics (Pittsburgh, Pa.). Copper II AcAc was obtained from Acros Organics and Aldrich Chemical. The untreated fumed silica was obtained from Cabot Corp (Tuscola, Ill.). The dibutyl tin diacetate was obtained from Atochem Corporation (Philadelphia, Pa.). The silane and siloxane compounds were obtained from Dow Corning Corporation (Midland, Mich.). Ethylpolysilicate was obtained from Huls of America, Inc. (Piscataway, N.J.).

Example 1

Formulations were prepared as shown in Table 1.1. Ingredients numbered as 1, 2, 3 and 10 were combined with a compounder at approximately 70° C., packaged into cartridges and then deaired. Ingredients numbered 4, 5, 6, 7, 8, 9 and 11 were mixed together and then injected into and mixed with the mixture of ingredients 1, 2, 3 and 10 using a Semco mixer (Model 388, Products Research and Chemical Corp, Glendale, Calif.). Samples were cast, cured and then tested in hot oil. Formulation 1A is a control. Formulations 1B, 1C and 1D all have copper acetylacetonate added. Formulations 1B and 1D also have added calcium acetate and Formulation 1C also has added strontium acetate. The post oil immersion tensile strength improved from 0.52 N/mm$^2$ without the additives to 0.68 N/mm$^2$ or greater with the additives. The post oil immersion durometer and modulus measurements demonstrated better integrity with additives than without as shown in the results provided in Tables 1.2(a) and 1.2(b).

TABLE 1.1

Formulations

| Component (parts) | Form. 1A* | Form. 1B | Form. 1C | Form. 1D |
| --- | --- | --- | --- | --- |
| 1. 17.5 Pa · s, 85% silanol terminated and 15% trimethyl terminated polydimethylsiloxane | 100.00 | 100.00 | 100.00 | 100.00 |
| 2. Untreated fumed silica having a surface area of approximately 200 m$^2$/g | 12.42 | 12.42 | 12.42 | 12.42 |
| 3. Mixture of methyl (~45%) and ethyl (~55%) triacetoxysilane | 5.83 | 5.83 | 5.83 | 5.83 |
| 4. 0.1 Pa · s Trimethyl Endblocked Polydimethylsiloxane | 4.74 | 4.74 | 4.74 | 4.74 |
| 5. Approximately 0.075 Pa · s hydroxy-terminated polydimethylsiloxane | 2.37 | 2.37 | 2.37 | 2.37 |
| 6. Ethylpolysilicate | 1.27 | 1.27 | 1.27 | 1.27 |
| 7. Copper acetylacetonate | 0.00 | 0.24 | 0.24 | 0.24 |
| 8. Calcium Acetate | 0.00 | 1.06 | 0.00 | 0.39 |
| 9. Strontium Acetate | 0.00 | 0.00 | 1.06 | 0.00 |
| 10. Dibutyl tin diacetate | 0.03 | 0.03 | 0.03 | 0.03 |
| 11. Blue Silicone Paste** | 0.42 | 0.42 | 0.42 | 0.42 |

*Formulation 1A is the control, with no additives included.
**Ferro SV1232, Ferro Corp. (Edison, NJ)

TABLE 1.2(a)

Initial Results Prior to Oil Immersion

| | Form. 1A* | Form. 1B | Form. 1C | Form. 1D |
| --- | --- | --- | --- | --- |
| Durometer, Shore A | 24 | 27 | 26 | 26 |
| Tensile Strength, N/mm$^2$ | 1.37 | 1.52 | 1.77 | 1.37 |
| Elongation, % | 347 | 346 | 417 | 344 |
| Modulus @ 100%, N/mm$^2$ | 0.48 | 0.54 | 0.50 | 0.50 |

*Formulation 1A is the control, with no additives included.

TABLE 1.2(b)

5W30 Oil Immersion Results

| | Form. 1A* | Form. 1B | Form. 1C | Form. 1D |
| --- | --- | --- | --- | --- |
| Durometer, Shore A | 1 | 4 | 5 | 5 |
| Tensile Strength, N/mm$^2$ | 0.52 | 0.69 | 0.92 | 0.68 |
| Elongation, % | 715 | 549 | 520 | 481 |

TABLE 1.2(b)-continued

5W30 Oil Immersion Results

| | Form. 1A* | Form. 1B | Form. 1C | Form. 1D |
| --- | --- | --- | --- | --- |
| Modulus @ 100%, N/mm$^2$ | 17 | 27 | 35 | 32 |
| Volume Swell % | 49 | 46 | 49 | 52 |

*Formulation 1A is the control, with no additives included.

Example 2

The ingredients listed in Table 2.1 were mixed and tested as described in Example 1. Ingredients numbered as 1, 2, 3 and 10 were combined with a compounder at approximately 70° C., packaged into cartridges and then deaired. Ingredients numbered 4, 5, 6, 7, 8, 9, 11 and 12 were mixed together and then injected into and mixed with the mixture of ingredients 1, 2, 3, and 10 using a Semco mixer. The post oil immersion tensile strength was improved with the addition of the calcium acetate and copper AcAc, individually, however the combined effect is greater than either with copper AcAc or calcium acetate added individually. Samples 2A, 2B, and 2C, demonstrate the oil performance of the RTV at three different levels of calcium acetate. The increase in the added hydroxy terminated polymer with sample 2D helped to reduce elongation prior to and after oil immersion. Sample 2E shows that post addition of silica (in this case treated, fumed silica) does not reduce the post oil immersion performance of the material. The results are provided in Tables 2.2(a) and 2.2(b).

TABLE 2

Formulations

| Component (parts) | Form. 2A | Form. 2B | Form. 2C | Form. 2D | Form. 2E |
| --- | --- | --- | --- | --- | --- |
| 1. 17.5 Pa · s, 85% silanol terminated and 15% trimethyl terminated polydimethylsiloxane | 100.00 | 100.00 | 100.00 | 100.00 | 100.00 |
| 2. Untreated fumed silica having a surface area of approximately 200 m$^2$/g | 12.42 | 12.42 | 12.42 | 12.42 | 12.42 |
| 3. Mixture of methyl (~45%) and ethyl (~55%) triacetoxysilane | 5.83 | 5.83 | 5.83 | 5.83 | 5.83 |
| 4. 0.1 Pa · s Trimethyl Endblocked Polydimethylsiloxane | 4.74 | 4.74 | 4.74 | 4.74 | 4.74 |
| 5. Approximately 0.075 Pa · s hydroxy-terminated polydimethylsiloxane | 2.37 | 2.37 | 2.37 | 4.74 | 2.37 |
| 6. Ethylpolysilicate | 1.27 | 1.27 | 1.27 | 1.27 | 1.27 |
| 7. Copper acetylacetonate | 0.24 | 0.24 | 0.24 | 0.24 | 0.24 |
| 8. Calcium Acetate | 0.41 | 0.81 | 1.06 | 1.06 | 1.06 |
| 9. Strontium Acetate | 0.00 | 0.00 | 0.00 | 0.00 | 0.00 |
| 10. Dibutyl tin diacetate | 0.03 | 0.03 | 0.03 | 0.03 | 0.03 |
| 11. Blue Silicone Paste* | 0.00 | 0.00 | 0.00 | 0.00 | 0.00 |

TABLE 2-continued

Formulations

| Component (parts) | Form. 2A | Form. 2B | Form. 2C | Form. 2D | Form. 2E |
|---|---|---|---|---|---|
| 12. Treated fumed silica having a surface area of approximately 110 m$_2$/g** | 0.00 | 0.00 | 0.00 | 0.00 | 1.27 |

*Ferro SV1232, Ferro Corp. (Edison, NJ)
**R972, Degussa Corporation (Waterford, NY)

TABLE 2.2(a)

Initial Results Prior to Oil Immersion

| | Form. 2A | Form. 2B | Form. 2C | Form. 2D | Form. 2E |
|---|---|---|---|---|---|
| Durometer, Shore A | 23 | 24 | 25 | 23 | 26 |
| Tensile Strength, N/mm$^2$ | 1.64 | 1.41 | 1.37 | 1.29 | 1.63 |
| Elongation, % | 427 | 384 | 369 | 361 | 409 |
| Modulus @ 100%, N/mm$^2$ | 65 | 67 | 67 | 65 | 71 |

TABLE 2.2(b)

5W30 Oil Immersion Results

| | Form. 2A | Form. 2B | Form. 2C | Form. 2D | Form. 2E |
|---|---|---|---|---|---|
| Durometer, Shore A | 4 | 3 | 3 | 4 | 4 |
| Tensile Strength, N/mm$^2$ | 0.75 | 0.68 | 0.60 | 0.61 | 0.69 |
| Elongation, % | 621 | 678 | 546 | 501 | 572 |
| Modulus @ 100%, N/mm$^2$ | 25 | 22 | 24 | 26 | 26 |
| Volume Swell % | 49 | 49 | 51 | 45 | 48 |

Example 3

Formulations were prepared as shown in Table 3.1(a) and (b). Ingredients numbered as 1, 2, 3 and 10 were combined with a compounder at approximately 70° C., packaged into cartridges and deaired. Ingredients numbered 4, 5, 6, 7, 8, 9 and 11 were mixed together and then injected into and mixed with the mixture of ingredients 1, 2, 3 and 10 using a Semco mixer. Samples were cast, cured and then tested in hot oil. Formulation 3C is the control. Formulations 3A and 3B have two levels of strontium acetate and formulations 3D and 3E have two levels of calcium acetate. Formulations 3F and 3G have copper acetylacetonate added to an intermediate level of strontium acetate (3F) or an intermediate level of calcium acetate (3G).

Testing for Example 3 has the following variations: a) the sample thickness was 0.140 cm±0.013 cm; b) the cure time was 1 day; and c) the hot oil immersion was 7 days. The post oil immersion tensile strength improved from 0.43 N/mm$^2$ without the additives to 0.61 N/mm$^2$ or greater with the additives. The post oil immersion durometer and modulus, elongation and volume swell measurements demonstrated better integrity with additives than without as shown in the results provided in Table 3.2(b).

TABLE 3.1(a)

Addition of Strontium Acetate or Calcium Acetate

| Component (parts) | Form. 3A | Form. 3B | Form. 3C* | Form. 3D | Form. 3E |
|---|---|---|---|---|---|
| 1. 17.5 Pa · s, 85% silanol terminated and 15% trimethyl terminated polydimethylsiloxane | 100.00 | 100.00 | 100.00 | 100.00 | 100.00 |
| 2. Untreated fumed silica having a surface area of approximately 200 m$^2$/g | 12.42 | 12.42 | 12.42 | 12.42 | 12.42 |
| 3. Mixture of methyl (~45%) and ethyl (~55%) triacetoxysilane | 5.83 | 5.83 | 5.83 | 5.83 | 5.83 |
| 4. 0.1 Pa · s Trimethyl Endblocked Polydimethylsiloxane | 4.74 | 4.74 | 4.74 | 4.74 | 4.74 |
| 5. Approximately 0.075 Pa · s hydroxy-terminated polydimethylsiloxane | 2.37 | 2.37 | 2.37 | 2.37 | 2.37 |
| 6. Ethylpolysilicate | 1.27 | 1.27 | 1.27 | 1.27 | 1.27 |
| 7. Copper acetylacetonate | 0.00 | 0.00 | 0.00 | 0.00 | 0.00 |
| 8. Calcium Acetate | 0.00 | 0.00 | 0.00 | 0.51 | 1.06 |
| 9. Strontium Acetate | 0.51 | 1.06 | 0.00 | 0.00 | 0.00 |
| 10. Dibutyl tin diacetate | 0.03 | 0.03 | 0.03 | 0.03 | 0.03 |
| 11. Blue Silicone Paste** | 0.42 | 0.42 | 0.42 | 0.42 | 0.42 |

*Formulation 3C is the control, with no additives (7, 8, or 9) included.
**Ferro SV1232, Ferro Corp. (Edison, NJ)

TABLE 3.1(b)

Addition of Copper AcAc and Either Strontium Acetate or Calcium Acetate

| Component (parts) | Form. 3F | Form. 3G |
|---|---|---|
| 1. 17.5 Pa · s, 85% silanol terminated and 15% trimethyl terminated polydimethylsiloxane | 100.00 | 100.00 |
| 2. Untreated fumed silica having a surface area of approximately 200 m$^2$/g | 12.42 | 12.42 |
| 3. Mixture of methyl (~45%) and ethyl (~55%) triacetoxysilane | 5.83 | 5.83 |
| 4. 0.1 Pa · s Trimethyl-Endblocked Polydimethylsiloxane | 4.74 | 4.74 |
| 5. Approximately 0.075 Pa · s hydroxy-terminated polydimethylsiloxane | 2.37 | 2.37 |
| 6. Ethylpolysilicate | 1.27 | 1.27 |
| 7. Copper acetylacetonate | 0.24 | 0.24 |
| 8. Calcium Acetate | 0.00 | 0.81 |
| 9. Strontium Acetate | 0.81 | 0.00 |
| 10. Dibutyl tin diacetate | 0.03 | 0.03 |
| 11. Blue Silicone Paste** | 0.42 | 0.42 |

**Ferro SV1232, Ferro Corp. (Edison, NJ)

TABLE 3.2(a)

Initial Results Prior to Oil Immersion

| Formulation | Durometer Shore A | Tensile N/mm² | Elongation % | 100% Modulus N/mm² |
|---|---|---|---|---|
| 3A | 25 | 1.65 | 433 | 0.46 |
| 3B | 24 | 1.44 | 394 | 0.43 |
| 3C | 23 | 2.03 | 427 | 0.45 |
| 3D | 24 | 1.63 | 421 | 0.45 |
| 3E | 24 | 1.70 | 443 | 0.46 |
| 3F | 24 | 1.54 | 403 | 0.47 |
| 3G | 23 | 1.73 | 449 | 0.46 |

TABLE 3.2(b)

5W30 Oil Immersion Results

| Formulation | Durometer Shore A | Tensile N/mm² | Elongation % | 100% Modulus N/mm² | Volume Swell % |
|---|---|---|---|---|---|
| 3A | 1 | 0.68 | 712 | 0.17 | 50 |
| 3B | 1 | 0.61 | 656 | 0.17 | 51 |
| 3C | 0 | 0.43 | 823 | 0.10 | 53 |
| 3D | 3 | 0.73 | 665 | 0.17 | 49 |
| 3E | 1 | 0.63 | 740 | 0.14 | 52 |
| 3F | 4 | 0.73 | 624 | 0.19 | 51 |
| 3G | 4 | 0.83 | 677 | 0.19 | 49 |

Example 4

The ingredients listed in Table 4.1 were mixed and tested as described in Example 1. Ingredients numbered as 1, 2, 3 and 6 were combined with a compounder at approximately 70° C., packaged into cartridges and then deaired. Ingredients numbered 4 and 5 were mixed together and then injected into and mixed with the mixture of ingredients 1, 2, 3, and 6 using a Semco mixer. In this example different amounts of the copper AcAc were used individually. The results are provided in Tables 4.2(a) and 4.2(b).

TABLE 4.1(a)

Addition of Copper Acetylacetonate Only

| Component (parts) | 4A | 4B | 4C | 4D | 4E |
|---|---|---|---|---|---|
| 1. 17.5 Pa · s, 85% silanol terminated and 15% trimethyl terminated polydimethylsiloxane | 100.00 | 100.00 | 100.00 | 100.00 | 100.00 |
| 2. Untreated fumed silica having a surface area of approximately 200 m²/g | 22.21 | 22.21 | 22.21 | 22.21 | 22.21 |
| 3. Mixture of methyl (~45%) and ethyl (~55%) triacetoxysilane | 9.15 | 9.15. | 9.15 | 9.15 | 9.15 |
| 4. 12 Pa · s Trimethyl Endblocked Polydimethylsiloxane | 1.97 | 1.97 | 1.97 | 1.97 | 1.97 |
| 5. Copper acetylacetonate | 0.32 | 0.52 | 0.99 | 1.31 | 1.97 |
| 6. Dibutyl tin diacetate | 0.05 | 0.05 | 0.05 | 0.05 | 0.05 |

TABLE 4.2(a)

Initial Results Prior to Oil Immersion

| Formulation | Durometer Shore A | Tensile N/mm² | Elongation % | 100% Modulus N/mm² |
|---|---|---|---|---|
| 4A | 46 | 2.47 | 240 | 1.30 |
| 4B | 46 | 2.70 | 269 | 1.27 |
| 4C | 48 | 2.79 | 280 | 1.27 |
| 4D | 49 | 2.42 | 239 | 1.28 |
| 4E | 49 | 2.43 | 244 | 1.28 |

TABLE 4.2(b)

5W30 Oil Immersion Results

| Formulation | Durometer Shore A | Tensile N/mm² | Elongation % | 100% Modulus N/mm² | Volume Swell % |
|---|---|---|---|---|---|
| 4A | 13 | 0.88 | 354 | 0.42 | 36 |
| 4B | 15 | 0.92 | 294 | 0.49 | 35 |
| 4C | 17 | 1.14 | 329 | 0.53 | 35 |
| 4D | 15 | 1.05 | 311 | 0.52 | 35 |
| 4E | 14 | 0.96 | 305 | 0.5 | 35 |

We claim:

1. A RTV silicone composition which is curable in the presence of moisture, comprising:

(A) 100 parts by weight of a polydiorganosiloxane in which the terminal groups are selected from the group consisting of silanol and triorganosilyl groups, provided at least 60 mole percent of the terminal groups are silanol groups;

(B) 1 to 15 parts by weight of an acyloxy-functional crosslinking agent described by the formula $$R_mSi(OCOR')_{4-m}$$

where R is a monovalent hydrocarbon radical comprising from 1 to about 12 carbon atoms, each R' is an independently selected monovalent hydrocarbon radical comprising from 1 to about 12 carbon atoms, and m is 0 or 1;

(C) 0.001 to 1 part by weight of a metal salt of a carboxylic acid catalyst, provided the metal salt of a carboxylic acid catalyst does not include calcium acetate, zinc acetate, magnesium acetate, aluminum acetate, zirconium acetate, barium acetate, titanium acetate, strontium acetate, and copper acetate;

(D) 5 to 150 parts by weight of a filler;

(E) an amount of a metal acetate effective for providing increased hot oil resistance to the RTV silicone composition upon curing, where the metal portion of the metal acetate is selected from the group consisting of calcium, zinc, magnesium, aluminum, zirconium, barium, titanium, strontium, and copper; and (F) optionally, an amount of a metal acetylacetonate effective for providing increased hot oil resistance to the RTV silicone composition upon curing.

2. The RTV silicone composition of claim 1, where Component (E) comprises about 0.01 to 10 parts by weight of the metal acetate, based on 100 parts by weight of the polydiorganosiloxane.

3. The RTV silicone composition of claim 1, where Component (E) comprises about 0.01 to 1.5 parts by weight of the metal acetate, based on 100 parts by weight of the polydiorganosiloxane.

4. The RTV silicone composition of claim 1, where Component (E) comprises about 0.01 to 1 part by weight of strontium acetate or calcium acetate, based on 100 parts by weight of the polydiorganosiloxane.

5. The RTV silicone composition of claim 3, where the polydiorganosiloxane is a polydimethylsiloxane in which 80 to 100 mole percent of the terminal groups are silanol groups; R and R' of the acyloxy-functional crosslinking agent are independently selected from the group consisting of methyl and ethyl, and m is 1; the catalyst is a tin salt of a carboxylic acid; and the filler is a silica filler.

6. The RTV silicone composition of claim 4, comprising:
   (A) 100 parts by weight of a polydimethylsiloxane in which 80 to 100 mole percent of the terminal groups are silanol groups;
   (B) 2 to 10 parts by weight of the acyloxy-functional crosslinking agent where R and R' are independently selected from the group consisting of methyl and ethyl, and m is 1;
   (C) 0.01 to 0.3 part by weight of a tin salt of a carboxylic acid catalyst; and
   (D) 5 to 30 parts by weight of a fumed silica.

7. The RTV silicone composition of claim 2, where Component (F) comprises about 0.01 to 5 parts by weight of the metal acetylacetonate based on 100 parts by weight of the polydiorganosiloxane.

8. The RTV silicone composition of claim 3, where Component (F) comprises about 0.05 to 1.5 parts by weight of the metal acetylacetonate based on 100 parts by weight of the polydiorganosiloxane, where the metal portion of the metal acetylacetonate is selected from the group consisting of copper, chromium, iron, aluminum, zinc, titanium and zirconium.

9. The RTV silicone composition of claim 4, where Component (F) comprises about 0.1 to 0.6 parts by weight copper acetylacetonate based on 100 parts by weight of the polydiorganosiloxane.

10. The RTV silicone composition of claim 8, where the polydiorganosiloxane is a polydimethylsiloxane in which 80 to 100 mole percent of the terminal groups are silanol groups; R and R' of the acyloxy-functional crosslinking agent are independently selected from the group consisting of methyl and ethyl, and m is 1; the catalyst is a tin salt of a carboxylic acid; and the filler is a silica filler.

11. The RTV silicone composition of claim 9, comprising:
   (A) 100 parts by weight of a polydimethylsiloxane in which 80 to 100 mole percent of the terminal groups are silanol groups;
   (B) 2 to 10 parts by weight of the acyloxy-functional crosslinking agent where R and R' are independently selected from the group consisting of methyl and ethyl, and m is 1;
   (C) 0.01 to 0.3 part by weight of a tin salt of a carboxylic acid catalyst; and
   (D) 5 to 30 parts by weight of a fumed silica.

* * * * *